United States Patent
Taguchi et al.

(10) Patent No.: US 12,128,360 B2
(45) Date of Patent: Oct. 29, 2024

(54) HOLLOW FIBER MEMBRANE MODULE

(71) Applicant: NITTO DENKO CORPORATION, Ibaraki (JP)

(72) Inventors: Masamitsu Taguchi, Osaka (JP); Hiroki Fujioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 127 days.

(21) Appl. No.: 17/189,962

(22) Filed: Mar. 2, 2021

(65) Prior Publication Data
US 2021/0275973 A1    Sep. 9, 2021

(30) Foreign Application Priority Data

Mar. 3, 2020 (JP) ................................. 2020-035847

(51) Int. Cl.
 *B01D 63/02* (2006.01)
 *B01D 65/02* (2006.01)

(52) U.S. Cl.
 CPC ........... *B01D 65/02* (2013.01); *B01D 63/023* (2013.01); *B01D 63/024* (2013.01); *B01D 2321/04* (2013.01); *B01D 2321/168* (2013.01)

(58) Field of Classification Search
 CPC .... B01D 63/02; B01D 63/023; B01D 63/024; B01D 2321/04; B01D 2321/168
 See application file for complete search history.

(56) References Cited

U.S. PATENT DOCUMENTS

| | | | |
|---|---|---|---|
| 9,802,842 B2 | 10/2017 | Shiki | |
| 2004/0178136 A1* | 9/2004 | Taniguchi | B01D 63/023 210/321.79 |
| 2007/0163942 A1* | 7/2007 | Tanaka | B01D 63/043 210/321.89 |
| 2013/0264251 A1 | 10/2013 | Johnson et al. | |
| 2015/0182916 A1* | 7/2015 | Kanai | C02F 1/44 210/321.89 |
| 2016/0158670 A1* | 6/2016 | Tanizaki | B01D 63/04 210/321.87 |
| 2016/0332109 A1* | 11/2016 | Milli | B01D 53/229 |
| 2018/0050308 A1* | 2/2018 | Lee | B01D 69/08 |

(Continued)

FOREIGN PATENT DOCUMENTS

| | | | | |
|---|---|---|---|---|
| AU | 2016354941 A1 * | 6/2018 | ............ | B01D 63/02 |
| JP | H05137972 | 6/1993 | | |

(Continued)

OTHER PUBLICATIONS

Machine translation of JP-2004058022-A, Ando (Year: 2004).*

(Continued)

Primary Examiner — Patrick Orme
(74) Attorney, Agent, or Firm — HSML P.C.

(57) ABSTRACT

A hollow fiber membrane module 100 includes: a plurality of hollow fiber membranes 10; a container 20 storing the plurality of hollow fiber membranes 10; and a feed water inlet 201 provided at one end portion of the container 20 such that a direction in which feed water flows into the container 20 is parallel to a longitudinal direction of the plurality of hollow fiber membranes 10. A permeation flux of the hollow fiber membranes 10 at a transmembrane pressure difference of 0.1 MPa is higher than or equal to 850 liter/m²/h.

7 Claims, 7 Drawing Sheets

(56) References Cited

U.S. PATENT DOCUMENTS

| | | | |
|---|---|---|---|
| 2018/0085715 A1* | 3/2018 | Lee | ............................ C02F 1/44 |
| 2018/0169590 A1 | 6/2018 | Yabuno et al. | |
| 2019/0015786 A1 | 1/2019 | Shimura et al. | |

FOREIGN PATENT DOCUMENTS

| | | | |
|---|---|---|---|
| JP | H0938470 A | * | 2/1997 |
| JP | 2002233739 A | | 8/2002 |
| JP | 2002303435 | | 10/2002 |
| JP | 2004058022 A | * | 2/2004 |
| JP | 2006021109 A | * | 1/2006 |
| JP | 2006239680 A | | 9/2006 |
| JP | 4371412 B2 | | 11/2009 |
| JP | 2013202461 A | | 10/2013 |
| JP | 2015182056 A | | 10/2015 |
| JP | 2016179430 | | 10/2016 |
| JP | 2018008272 A | | 1/2018 |
| JP | 2019000815 A | | 1/2019 |
| KR | 20140094223 | | 7/2014 |
| KR | 20140094223 A | * | 7/2014 |
| KR | 20170036978 A | * | 2/2017 |
| WO | 2015146469 A1 | | 10/2015 |
| WO | 2017115769 A1 | | 7/2017 |

OTHER PUBLICATIONS

JPH0938470 A, English machine translation, Murase (Year: 1997).*
JP2006021109 A, English machine translation, Hasegawa (Year: 2006).*
Kim, KR20140094223 A, English machine translation (Year: 2014).*
Choi, KR20170036978 A, English machine translation (Year: 2017).*
Extended European Search Report issued for European Patent Application No. 21159879.2, dated Jun. 17, 2021, 9 pages.
Third Party Observation issued for Japanese Patent Application No. 2020-035847, Submission date: Dec. 26, 2022, 30 pages including English machine translation.
Notice of Reasons for Refusal issued for Japanese Patent Application No. 2020-035847, Dispatch Date: Jul. 25, 2023, 9 pages including English machine translation.

* cited by examiner

هولو FIBER MEMBRANE MODULE

BACKGROUND OF THE INVENTION

1. Field of the Invention

The present invention relates to a hollow fiber membrane module.

2. Description of Related Art

For manufacturing semiconductor devices, a large amount of ultrapure water is indispensable. The ultrapure water is produced by a water treatment system that includes a hollow fiber membrane module. The hollow fiber membrane module is disposed at a predetermined position in the water treatment system, and mainly contributes to removal of particulates that significantly hinder production of the semiconductor devices.

The hollow fiber membrane module may be cleaned in order to remove foreign matter such as contamination (fouling) on the surface of the hollow fiber membrane, particulates adhered to the surface of the hollow fiber membrane, or particulates accumulated in a container. The cleaning is performed, for example, periodically.

JP H05-137972 A discloses an external-pressure-type hollow fiber membrane module in which a turbulence member for permeate fluid is provided near an end portion on an outlet side of the hollow fiber membrane. JP 2016-179430 A discloses a backwashing method for a hollow fiber membrane module.

SUMMARY OF THE INVENTION

Feeding of ultrapure water from a hollow fiber membrane module is stopped during cleaning of the hollow fiber membrane module. Therefore, a time period for cleaning the hollow fiber membrane module is preferably as short as possible. As one of means for shortening the cleaning time, a flow rate of cleaning liquid may be increased. However, increase of the flow rate may lead to increase of a risk of damaging the hollow fiber membrane.

An object of the present invention is to shorten a time period for cleaning a hollow fiber membrane module while preventing damage to a hollow fiber membrane.

The present invention provides a hollow fiber membrane module that is of an external-pressure type, and the hollow fiber membrane module includes: a plurality of hollow fiber membranes; a container storing the plurality of hollow fiber membranes; and a feed water inlet provided at one end portion of the container such that a direction in which feed water flows into the container is parallel to a longitudinal direction of the plurality of hollow fiber membranes. A permeation flux of the hollow fiber membranes at a transmembrane pressure difference of 0.1 MPa is higher than or equal to 850 liter/m$^2$/h.

The hollow fiber membrane module of the present invention can be sufficiently cleaned in a short time period while damage to the hollow fiber membranes is prevented.

DETAILED DESCRIPTION OF THE INVENTION

An embodiment of the present invention will be described below with reference to the drawings. The present invention is not limited to the embodiment described below.

Figure 1:
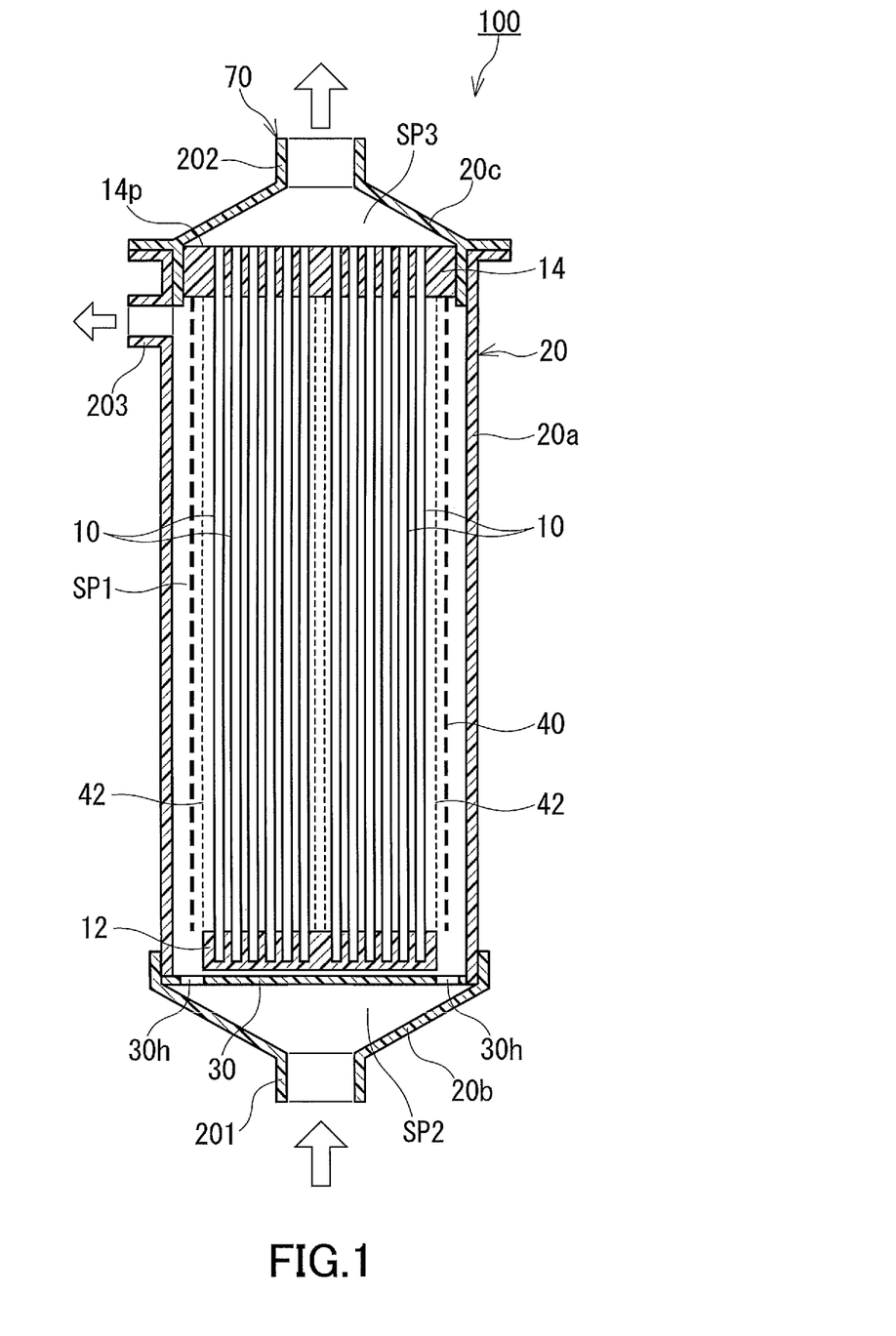
FIG. 1 is a longitudinal cross-sectional view of a hollow fiber membrane module according to one embodiment of the present invention.

FIG. 1 is a longitudinal cross-sectional view of a hollow fiber membrane module 100 according to one embodiment of the present invention. The hollow fiber membrane module 100 includes a plurality of hollow fiber membranes 10 and a container 20. The hollow fiber membrane module 100 is an external-pressure-type hollow fiber membrane module. The "external-pressure-type" represents a type in which feed water flows outside the hollow fiber membranes 10 and permeate water flows inside the hollow fiber membranes 10. In the present embodiment, the feed water is water to be treated. The permeate water is ultrapure water. The hollow fiber membrane module 100 is used for, for example, producing ultrapure water.

The container 20 is a component that stores the plurality of hollow fiber membranes 10. In the container 20, a feed water inlet 201, a permeate water outlet 202, and a concentrated water outlet 203 are provided. The feed water inlet 201 is provided at one end portion of the container 20 such that a direction in which feed water flows into the container 20 is parallel to the longitudinal direction of the plurality of hollow fiber membranes 10. In such a structure, the feed water can be prevented from directly colliding with the hollow fiber membranes 10 in the direction perpendicular to the longitudinal direction of the hollow fiber membranes 10. Therefore, the hollow fiber membranes 10 are unlikely to be damaged.

The permeate water outlet 202 is provided at the other end portion of the container 20 such that a direction in which permeate water flows to the outside of the container 20 is parallel to the longitudinal direction of the plurality of hollow fiber membranes 10. The concentrated water outlet 203 is provided at the other end portion of the container 20 such that a direction in which feed water flows from the container 20 to the outside of the container 20 is perpendicular to the longitudinal direction of the plurality of hollow fiber membranes 10. Such a structure also contributes to the above-described effect.

The container 20 includes a container body 20a, a cap 20b, and a cap 20c. The container body 20a is a cylindrical component that is opened at both end portions. The cap 20b and the cap 20c are funnel-shaped components attached to one end portion and the other end portion of the container body 20a. The cap 20b and the cap 20c are detachably attached to the container body 20a. The cap 20b and the container body 20a are fixed to each other by a fastening member such as a bolt and a screw. Similarly, the cap 20c and the container body 20a are fixed to each other by a fastening member such as a bolt and a screw. The feed water inlet 201 is an opening provided at the cap 20b. The permeate water outlet 202 is an opening provided at the cap 20c. The concentrated water outlet 203 is an opening provided at the container body 20a. Components such as piping and connectors can be connected to the feed water inlet 201, the permeate water outlet 202, and the concentrated water outlet 203.

In the hollow fiber membrane module 100, the number of the openings in the container 20 is three, and the three openings are the feed water inlet 201, the permeate water outlet 202, and the concentrated water outlet 203. The hollow fiber membrane module 100 allows the number of connecting portions of the piping to be reduced as compared with a case where four openings are provided in the container. This contributes to simplification and cost reduction of the water treatment system including the hollow fiber membrane module 100.

Internal spaces SP1, SP2, and SP3 that act as flow paths are present in the container 20. The internal space SP1 is an internal space of the container body 20a and acts as a feed water flow path. The internal space SP2 is an internal space of the cap 20b and acts as a feed water flow path. The internal space SP3 is an internal space of the cap 20c and acts as a permeate water flow path. The plurality of hollow fiber membranes 10 are opened toward the internal space SP3. The permeate water is sent through the internal space SP3 of the cap 20c from the hollow fiber membranes 10 to the outside of the hollow fiber membrane module 100.

A material of the container 20 is not particularly limited. The container 20 may be formed of resin such as vinyl chloride, polycarbonate, or polysulfone.

The plurality of hollow fiber membranes 10 are aligned in parallel with each other. The longitudinal direction of the hollow fiber membrane 10 is parallel to the longitudinal direction of the container 20. Examples of the hollow fiber membranes 10 include microfiltration membranes, ultrafiltration membranes, and reverse osmosis membranes. The hollow fiber membrane 10 is typically an ultrafiltration membrane. The number, the sizes, and a material of the hollow fiber membranes 10 are not particularly limited. The number of the hollow fiber membranes 10 is, for example, 1000 to 20000. The outer diameter of the hollow fiber membrane 10 is, for example, 0.2 to 2.0 mm. The length of the hollow fiber membrane 10 is, for example, 800 to 1200 mm. Examples of the material of the hollow fiber membrane 10 include polysulfone, polyether sulfone, poly(vinylidene fluoride), polyacrylonitrile, a poly(vinyl chloride)-polyacrylonitrile copolymer, polyamide, and cellulose acetate.

In a case where the hollow fiber membrane 10 is formed as an ultrafiltration membrane, the molecular weight cutoff thereof is, for example, in a range of 1000 to 500000. The term "molecular weight cutoff" refers to an approximate molecular weight of a low-concentration spherical solute (typical protein molecules) which can be 90% or more retained by the subject membrane.

The hollow fiber membrane 10 typically has skin layers on both the inner face side and the outer face side. A sponge layer is present between the skin layer and the skin layer. The sponge layer is a porous layer having a density lower than the skin layers. Such a structure is also referred to as a double-skin structure. The feed water is filtered twice through the two skin layers. Therefore, the hollow fiber membrane 10 having the double-skin structure can have a high rejection rate. Even if a defective portion is present in the skin layer on the outer face side, as long as the skin layer on the inner face side is not defective, particulates and the like can be prevented from mixing with permeate water. However, the skin layer may be present on the inner face side only or on the outer face side only.

The hollow fiber membrane module 100 further includes a binding portion 12 and a binding portion 14. For convenience sake, the binding portion 12 is referred to as "first binding portion 12", and the binding portion 14 is referred to as "second binding portion 14". The plurality of hollow fiber membranes 10 are bound by the first binding portion 12 and the second binding portion 14. The first binding portion 12 is provided at one end portions of the plurality of hollow fiber membranes 10. The plurality of hollow fiber membranes 10 are sealed at the one end portions by the first binding portion 12. The second binding portion 14 is provided at the other end portions of the plurality of hollow fiber membranes 10. The other end portions of the plurality of hollow fiber membranes 10 are opened at an end face 14p of the second binding portion 14. A bundle of the membranes is formed by the plurality of hollow fiber membranes 10, the first binding portion 12, and the second binding portion 14.

The binding portions 12 and 14 are formed by, for example, potting. In this case, the binding portions 12 and 14 are each referred to also as a potting portion. The binding portions 12 and 14 can be formed of resin filled between the hollow fiber membranes 10. Examples of the resin of the binding portions 12 and 14 include epoxy and urethane.

A gap through which feed water can pass is present between the first binding portion 12 and the inner face of the container 20. The second binding portion 14 separates the internal space SP1 as a feed water flow path and the internal space SP3 as a permeate water flow path from each other, in the container 20. The second binding portion 14 is fixed to the container body 20a or the cap 20c. In such a structure, the feed water and the permeate water are prevented from mixing with each other, and a high rejection rate can be achieved. The gap between the first binding portion 12 and the inner face of the container 20 may be present around the first binding portion 12 over 360 degrees.

In the present embodiment, the second binding portion 14 is fixed to the cap 20c by using an adhesive. The cap 20c is integrated with the second binding portion 14, and is attached to the other end portion of the container body 20a. The hollow fiber membranes 10, the second binding portion 14, and the cap 20c form a unit 70. The unit 70 can be detached from the container body 20a in a non-destructive manner. That is, the unit 70 can be detached from the container body 20a and the unit 70 can be attached to the container body 20a while integration of the second binding portion 14 and the cap 20c with each other is maintained. Such a structure contributes to reduction of an area of a wall surface of a flow path for permeate water, and reduction of dust generation.

Particulates are physically adsorbed to the wall surface of the flow path for permeate water, and are considered to be gradually separated from the wall surface according to flow of permeate water. The wall surface of the flow path for permeate water include the inner surfaces of the hollow fiber membranes 10, the surface of the second binding portion 14, and the inner surface of the cap 20c. A particulate adsorption site can be reduced by minimizing the surface of the second binding portion 14 and the inner surface of the cap 20c. A structure in which the second binding portion 14 is fixed to the cap 20c is advantageous in that the particulate adsorption site is reduced.

By detaching the unit 70 from the container body 20a, the hollow fiber membranes 10 and/or the second binding portion 14 can be cleaned or repaired. Thereafter, the unit 70 can be attached to the container body 20a. Alternatively, a new unit 70 can be attached to the container body 20a. That is, in the present embodiment, the hollow fiber membrane module 100 allows the hollow fiber membranes 10 and/or the second binding portion 14 to be quickly cleaned, changed, or repaired with ease. The components are not broken when the hollow fiber membranes 10 are detached from the container body 20a, whereby cost for the components can be reduced.

In the hollow fiber membrane module 100 of the present embodiment, another component is not present between the second binding portion 14 and the cap 20c. The other component is typically a seal ring. A groove into which a seal ring fits is not present between the second binding portion 14 and the cap 20c. That is, a groove into which a seal ring fits is not present in both the surface of the second binding portion 14 which faces the cap 20c and the surface of the cap 20c which faces the second binding portion 14. In such a structure, liquid accumulation is unlikely to occur or does not occur between the second binding portion 14 and the cap 20c. In other words, liquid such as permeate water is unlikely to be accumulated or is not accumulated between the second binding portion 14 and the cap 20c.

Contamination such as particulates is unlikely to be accumulated or is not accumulated between the second binding portion 14 and the cap 20c. Therefore, the hollow fiber membrane module 100 can be easily cleaned without disassembling the module 100.

In the description herein, "integration" represents a state where separation of components in a non-destructive manner cannot be performed. The "non-destructive manner" represents a state where separation and integration are reversible. For example, separation of components fixed to each other by an adhesive is not included in the concept of being the non-destructive manner.

Figure 2:
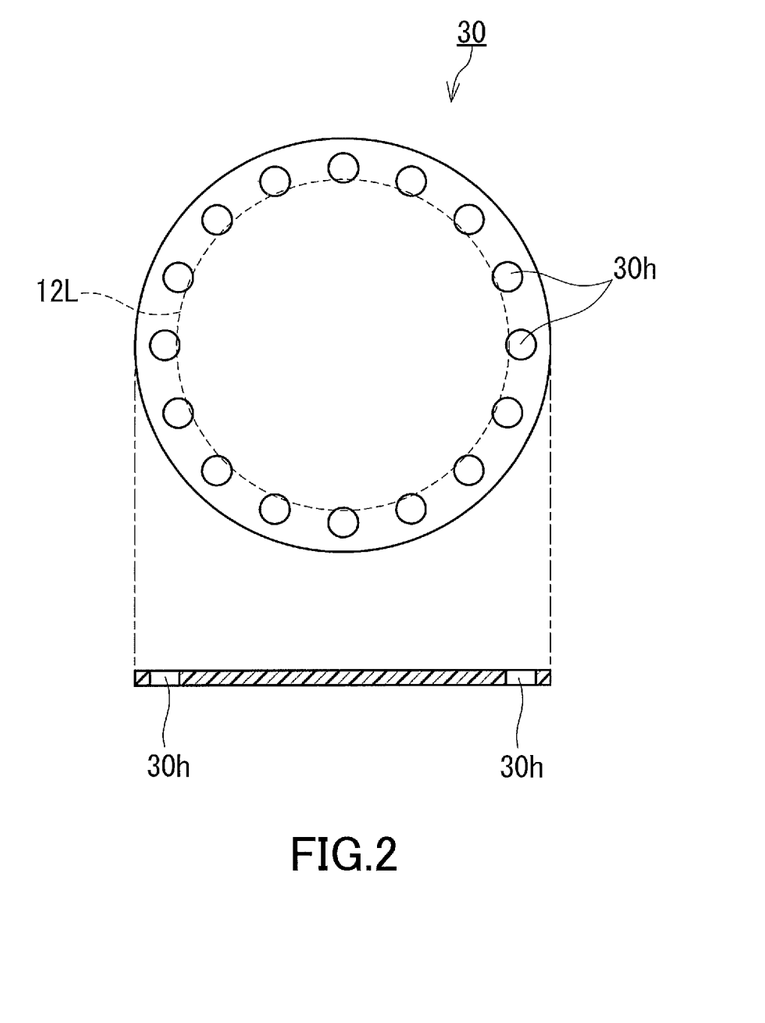
FIG. 2 is a plan view and a cross-sectional view of a baffle.

The hollow fiber membrane module 100 further includes a baffle 30. The baffle 30 is disposed in the container 20. More specifically, the baffle 30 is disposed between the feed water inlet 201 and the one end portions of the plurality of hollow fiber membranes 10. The baffle 30 opposes the first binding portion 12. A gap is present between the baffle 30 and the first binding portion 12. As shown in FIG. 2, the baffle 30 is, for example, a disc-shaped component formed of resin. A plurality of through holes 30h are provided in the outer circumferential portion of the baffle 30 along the circumferential direction. The internal space SP1 of the container body 20a and the internal space SP2 of the cap 20b communicate with each other through the through holes 30h. Feed water flows from the internal space SP2 through the through holes 30h toward the internal space SP1.

The baffle 30 prevents flow of feed water from directly colliding with the hollow fiber membranes 10 and the first binding portion 12 when the feed water is introduced through the feed water inlet 201 into the container 20. Thus, damage to the hollow fiber membranes 10 can be prevented. In the present embodiment, the baffle 30 is formed of a single plate-like component. However, the baffle 30 may be formed of a plurality of plate-like components.

The broken line in FIG. 2 represents a projection line 12L obtained by projecting the first binding portion 12 on the baffle 30 in the direction parallel to the longitudinal direction of the hollow fiber membrane 10. The first binding portion 12 is located inside the outer edge of the baffle 30 in the radial direction of the baffle 30. The projection line 12L of the first binding portion 12 slightly overlaps the through holes 30h. The projection line 12L of the first binding portion 12 may not necessarily overlap the through holes 30h. In such a structure, pressure of the flow of the feed water can be prevented from being applied to the hollow fiber membranes 10 and the first binding portion 12.

The hollow fiber membrane module 100 further includes an outer net 40 and a plurality of inner nets 42. The plurality of hollow fiber membranes 10 are bundled by the outer net 40 and the plurality of inner nets 42. The plurality of hollow fiber membranes 10 are bundled by the plurality of inner nets 42 such that the plurality of hollow fiber membranes 10 are separated into a plurality of bundles. The plurality of inner nets 42 are bundled by the outer net 40. In the double-net structure including the outer net 40 and the plurality of inner nets 42, the stiffness of the bundles of the plurality of hollow fiber membranes 10 can be enhanced. In this case, the hollow fiber membranes 10 are unlikely to oscillate in the container 20 by flow of water, and the hollow fiber membranes 10 are unlikely to be damaged. Particularly, the hollow fiber membranes 10 can be prevented from being damaged near a boundary between the hollow fiber membranes 10 and the second binding portion 14. The double-net structure is one of means for allowing feed water or cleaning liquid to flow at a high flow rate.

Figure 3A:
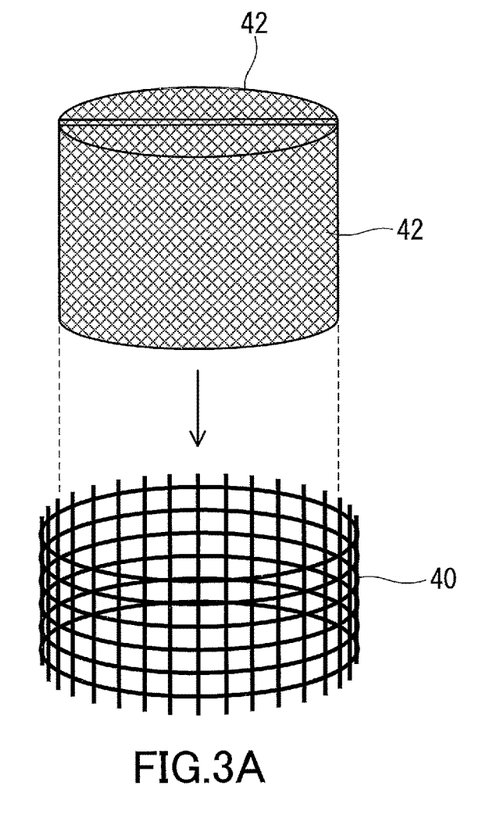
FIG. 3A is a perspective view of inner nets and an outer net.
Figure 3B:
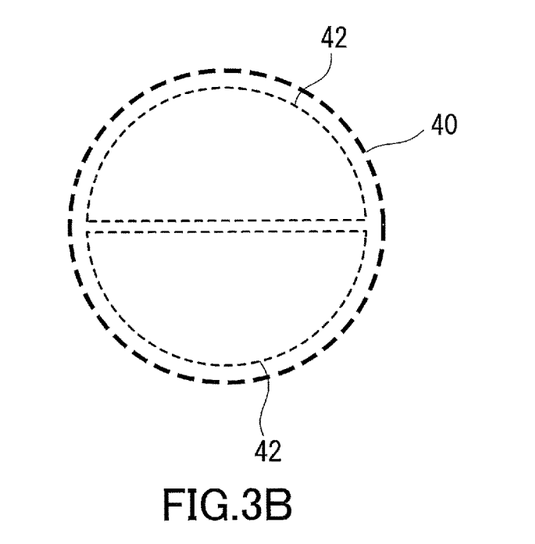
FIG. 3B illustrates a positional relationship between the inner nets and the outer net.

FIG. 3A is a perspective view of the outer net 40 and the inner nets 42. FIG. 3B illustrates a positional relationship between the inner nets 42 and the outer net 40. In the example illustrated in FIG. 3A and FIG. 3B, the plurality of hollow fiber membranes 10 are separated into two bundles and each bundle is bound by the inner net 42. The hollow fiber membranes 10 and the two inner nets 42 are bundled into one by the outer net 40.

Figure 3C:
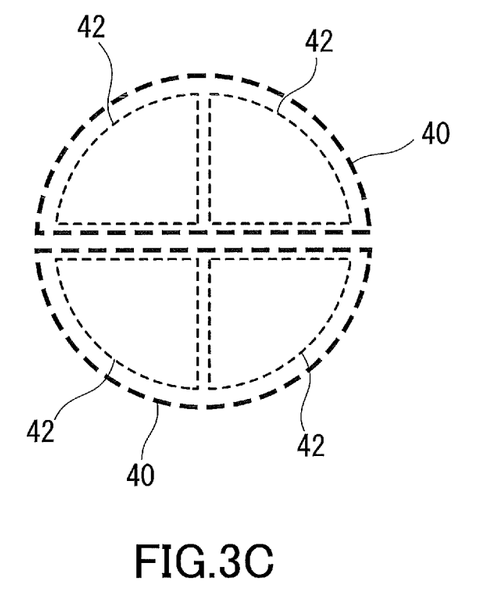
FIG. 3C illustrates another positional relationship between the inner nets and the outer nets.

FIG. 3C illustrates another positional relationship between the inner nets 42 and the outer nets 40. In the example illustrated in FIG. 3C, the plurality of hollow fiber membranes 10 are separated into four bundles, and each bundle is bound by the inner net 42. The hollow fiber membranes 10 and the four inner nets 42 are bundled into two by the outer nets 40.

The number of each of the outer nets 40 and the inner nets 42 is not particularly limited. However, the number of the inner nets 42 may be greater than or equal to three, and the number of the outer nets 40 may be greater than or equal to two. The structures of the outer net 40 and the inner net 42 are not particularly limited. In the examples illustrated in FIG. 3A to FIG. 3C, the mesh of the outer net 40 is rougher than the mesh of the inner net 42. Alternatively, the mesh of the inner net 42 may be rougher than the mesh of the outer net 40. The roughness of the mesh of the inner net 42 may be equal to the roughness of the mesh of the outer net 40.

The hollow fiber membrane module 100 of the present embodiment can be sufficiently cleaned in a short time period. In other words, the hollow fiber membrane module 100 is easily restored to exhibit its intrinsic performance by cleaning. Alternatively, an operating time necessary for a new hollow fiber membrane module 100 to exhibit a required performance is short. In a case where the hollow fiber membrane module 100 is cleaned, cleaning liquid is introduced through the feed water inlet 201 into the container 20, and discharged through the concentrated water outlet 203 to the outside of the container 20. Permeate water generated by filtering the cleaning liquid is discharged through the permeate water outlet 202 to the outside of the container 20. As the cleaning liquid, ultrapure water, acidic, alkaline, or oxidizing liquid, reducing liquid, a surfactant, or the like can be used. The cleaning liquid is typically ultrapure water. The "ultrapure water" refers to, for example, pure water having a specific resistance of 17 MΩ cm or higher. The specific resistance of pure water or ultrapure water can be measured in compliance with Japanese Industrial Standards JIS K0552 (1994).

The hollow fiber membrane module 100 is cleaned by causing the cleaning liquid to flow in the forward direction. The "forward direction" refers to a direction in which water flows in a normal operation. The cleaning in only the forward direction can prevent cleaning water from contaminating the flow path of the permeate water with particulates.

The cleaning time is considered to be shortened by increasing a flow rate of the cleaning liquid. That is, a time necessary for removing foreign matter such as particulates is considered to be shortened by causing the cleaning liquid to flow at a high flow rate. However, if the flow rate of the cleaning liquid is excessively high, the hollow fiber membrane may be damaged. Therefore, to date, a time for cleaning the hollow fiber membrane module has not been easily shortened.

Particularly, as in the hollow fiber membrane module disclosed in JP 2016-179430 A, in a case where both the feed water inlet and the concentrated water outlet are provided on the side surface of the container, the hollow fiber membrane is likely to be damaged by causing cleaning liquid to flow at a high flow rate.

Figure 4:
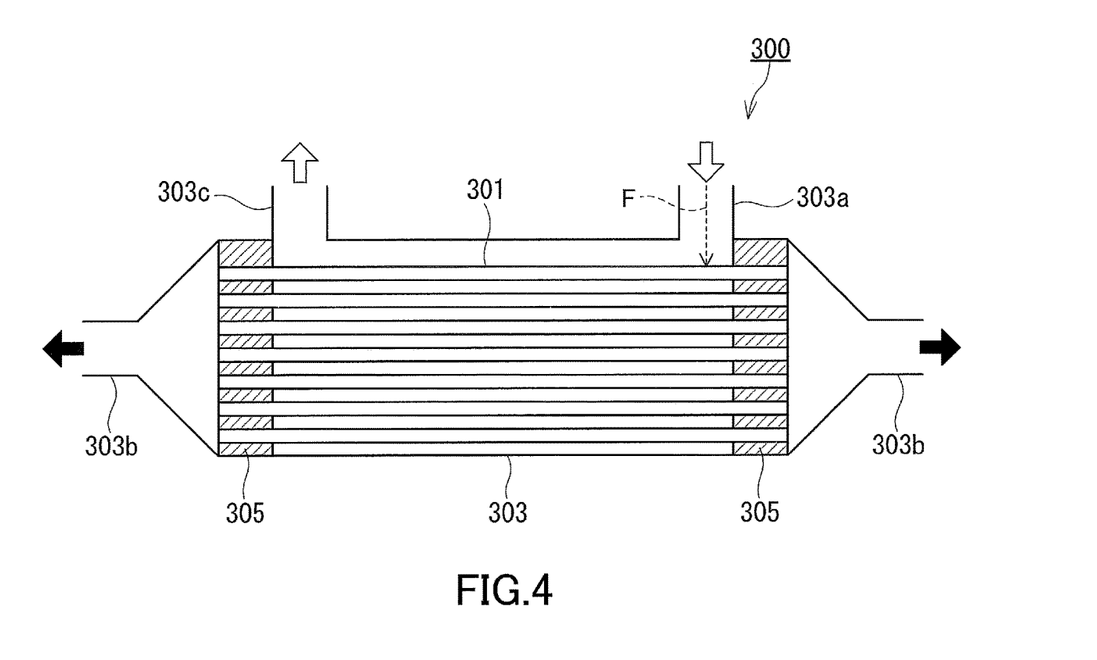
FIG. 4 illustrates a problem caused when a direction in which feed water flows is perpendicular to the longitudinal direction of a hollow fiber membrane.

FIG. 4 schematically illustrates a hollow fiber membrane module 300 disclosed in JP 2016-179430 A. The hollow fiber membrane module 300 has a feed water inlet 303a and a concentrated water outlet 303c provided in the side surface of a container 303. Permeate water is guided through permeate water outlets 303b provided in both end portions of the container 303 to the outside of the hollow fiber membrane module 300. Potting portions 305 are provided at both end portions of hollow fiber membranes 301, and a feed water flow path and a permeate water flow path are separated by the potting portions 305.

The feed water inlet 303a of the hollow fiber membrane module 300 illustrated in FIG. 4 is provided in the side surface of the container such that a direction in which feed water flows into the container 303 is perpendicular to the longitudinal direction of a plurality of the hollow fiber membranes 301. When cleaning liquid is introduced through the feed water inlet 303a, a water flow F presses the hollow fiber membranes 301 by the cleaning liquid in the direction perpendicular to the longitudinal direction. As a result, the hollow fiber membranes 301 are likely to be damaged near a boundary between the hollow fiber membranes 301 and the potting portion 305. A baffle may be disposed near the feed water inlet 303a. However, in a case where a flow rate of the cleaning liquid is very high, the effect of the baffle is limited.

The inventors of the present invention have successfully improved cleaning properties for the hollow fiber membrane module 100 by adopting a module structure that is unlikely to damage the hollow fiber membranes 10 as described above while using the hollow fiber membranes 10 capable of achieving a sufficient permeation flux. That is, in the present embodiment, the hollow fiber membrane module 100 includes the hollow fiber membranes 10 in which a permeation flux is higher than or equal to 850 liter/m$^2$/h at a transmembrane pressure difference of 0.1 MPa. In a case where the hollow fiber membrane module 100 is structured so as to satisfy the requirements, the hollow fiber membrane module 100 can be quickly cleaned.

In general, there is a trade-off between a permeation flux of a hollow fiber membrane and a strength of the hollow fiber membrane. A hollow fiber membrane having a high permeation flux is poor in strength. Therefore, even if the cleaning time is attempted to be shortened by adopting a hollow fiber membrane having a high permeation flux, cleaning at a high flow rate is difficult due to insufficient strength of the hollow fiber membrane.

Meanwhile, in the hollow fiber membrane module 100 of the present embodiment, a direction in which feed water flows into the container 20 is parallel to the longitudinal direction of the plurality of hollow fiber membranes 10. Therefore, a load is unlikely to be applied to the hollow fiber membrane 10 in the direction perpendicular to the longitudinal direction. Since a load is unlikely to be applied to the hollow fiber membrane 10 in the direction perpendicular to the longitudinal direction, even when the hollow fiber membrane 10 having a high permeation flux is used, the hollow fiber membrane 10 is unlikely to be damaged. Thus, the hollow fiber membrane module 100 that can withstand use at a high flow rate can be achieved. Furthermore, in a case where the baffle 30 is disposed between the feed water inlet 201 and the one end portions of the plurality of hollow fiber membranes 10, the bundle of the hollow fiber membranes 10 is unlikely to oscillate due to flow of water. The hollow fiber membranes 10 that can achieve a high permeation flux and a structure that can withstand use at a high flow rate act in cooperation with each other, to achieve the hollow fiber membrane module 100 that can be cleaned in a short time period while avoiding damage to the hollow fiber membranes 10. In other words, the hollow fiber membrane module 100 can be easily restored to exhibit its intrinsic performance by the cleaning. A time period from the start of operation until permeate liquid has a required water quality is also short.

The upper limit value of the permeation flux of the hollow fiber membrane 10 at the transmembrane pressure difference of 0.1 MPa is not particularly limited. However, in a case where the permeation flux is excessively high, rejection performance may be significantly degraded. The upper limit value of the permeation flux of the hollow fiber membrane 10 at the transmembrane pressure difference of 0.1 MPa is, for example, 3000 liter/m$^2$/h, and may be 1500 liter/m$^2$/h or 1300 liter/m$^2$/h. In this case, the feed water used for the operation is ultrapure water.

The hollow fiber membrane 10 that can exhibit the permeation flux of 850 liter/m$^2$/h or higher at a transmembrane pressure difference of 0.1 MPa can be obtained by a porous object producing method such as a non-solvent induced phase separation method (NIPS method), a thermally induced phase separation method, a polymerization-induced phase separation method, or track etching. For example, a non-solvent induced phase separation method is preferable since the hollow fiber membrane 10 can be easily produced. In order to obtain the hollow fiber membrane having a high permeation flux, for example, a concentration of a polymer in a polymer solution used for producing the hollow fiber membrane 10 may be lowered. The concentration of a polymer in a polymer solution is, but is not limited to, for example, less than or equal to 22% by weight and preferably less than or equal to 20% by weight. Furthermore, the hollow fiber membrane 10 having a high permeation flux can be produced by using known methods in combination as appropriate.

In the description herein, the "transmembrane pressure difference" refers to a difference between an average pressure of feed water and a pressure of permeate water at the permeate water outlet 202. The "average pressure of feed water" refers to an arithmetic average value of a pressure of feed water at the feed water inlet 201 and a pressure of concentrated water at the concentrated water outlet 203. For example, 25° C. ultrapure water is fed to the hollow fiber membrane module 100 such that the average pressure of feed water, and the pressure at the permeate water outlet 202 are in the above-described range, and the permeation flux of the hollow fiber membrane module 100 can be calculated from a flow rate of the permeate water and the total membrane area of the hollow fiber membranes 10. The permeation flux of the hollow fiber membrane 10 can be measured by using a module having a single hollow fiber membrane 10 as described below.

During cleaning of the hollow fiber membrane module 100, the hollow fiber membrane module 100 is operated such that, for example, an amount of permeate water is greater than or equal to 25 m$^3$/h. During cleaning of the hollow fiber membrane module 100, a flow rate of ultrapure water as the cleaning liquid is, for example, less than or equal to 30 m$^3$/h. The upper limit value of the amount of permeate water can be 30 m$^3$/h.

Inside the container 20, a tensile load is applied to the hollow fiber membrane 10. Therefore, the hollow fiber membrane 10 preferably has a sufficient tensile strength. The tensile strength of one hollow fiber membrane 10 is, for example, higher than or equal to 0.20 kgf, preferably higher than or equal to 0.23 kgf, even more preferably higher than or equal to 0.25 kgf, and most preferably higher than or equal to 0.29 kgf. In a case where the tensile strength of the hollow fiber membrane 10 is sufficiently ensured, when feed water or cleaning liquid flows at a high flow rate, the hollow fiber membrane 10 is unlikely to be broken. The upper limit value of the tensile strength of the hollow fiber membrane 10 is, but is not particularly limited, for example, 1.0 kgf.

The tensile strength (tensile breaking load) of the hollow fiber membrane 10 can be measured by, for example, the following method. An appropriate measuring device (for example, Autograph AGS-X 50N manufactured by SHIMADZU CORPORATION) is used to perform a tensile test under the conditions that an effective sample length is 100 mm, a tensile speed is 200 mm/min, and ambient temperature is 25° C. The highest load immediately before breaking is regarded as the tensile strength (kgf).

Whether or not the cleaning has been sufficiently performed is determined based on, for example, a specific resistance of the permeate water (ultrapure water). The further the cleaning progresses, the less the concentration of an electrolyte becomes, and the specific resistance of the permeate water increases. The criterion for determining that the cleaning has been sufficiently performed is different depending on a required water quality. For example, in a case where the specific resistance of the permeate water at 25° C. is higher than or equal to 17.5 MΩ·cm and preferably in a case where the specific resistance of the permeate water at 25° C. is higher than or equal to 18 MΩ·cm, the hollow fiber membrane module 100 can be determined to have been sufficiently cleaned.

Whether or not the cleaning has been sufficiently performed may be determined based on the number of particulates contained per unit volume of permeate water. The criterion for determining that the cleaning has been sufficiently performed is different depending on a required water quality. For example, in a case where the number of particulates each having a size of 100 nm or larger is less than or equal to 1000 in 1 L of permeate water, preferably in a case where the number of particulates each having a size of 50 nm or larger is less than or equal to 200 in 1 L of permeate water, and more preferably in a case where the number of particulates each having a size of 50 nm or larger is less than or equal to 10 in 1 L of permeate water, the hollow fiber membrane module 100 can be determined to have been sufficiently cleaned. The number of particulates in ultrapure water can be counted in compliance with Japanese Industrial Standards JIS K0554 (1995).

The hollow fiber membrane module 100 of the present embodiment can produce ultrapure water at a high permeation flux during a normal operation as well as cleaning. Therefore, according to the present embodiment, the number of the hollow fiber membrane modules for ultrapure water in a water treatment system may be reduced.

Figure 5:
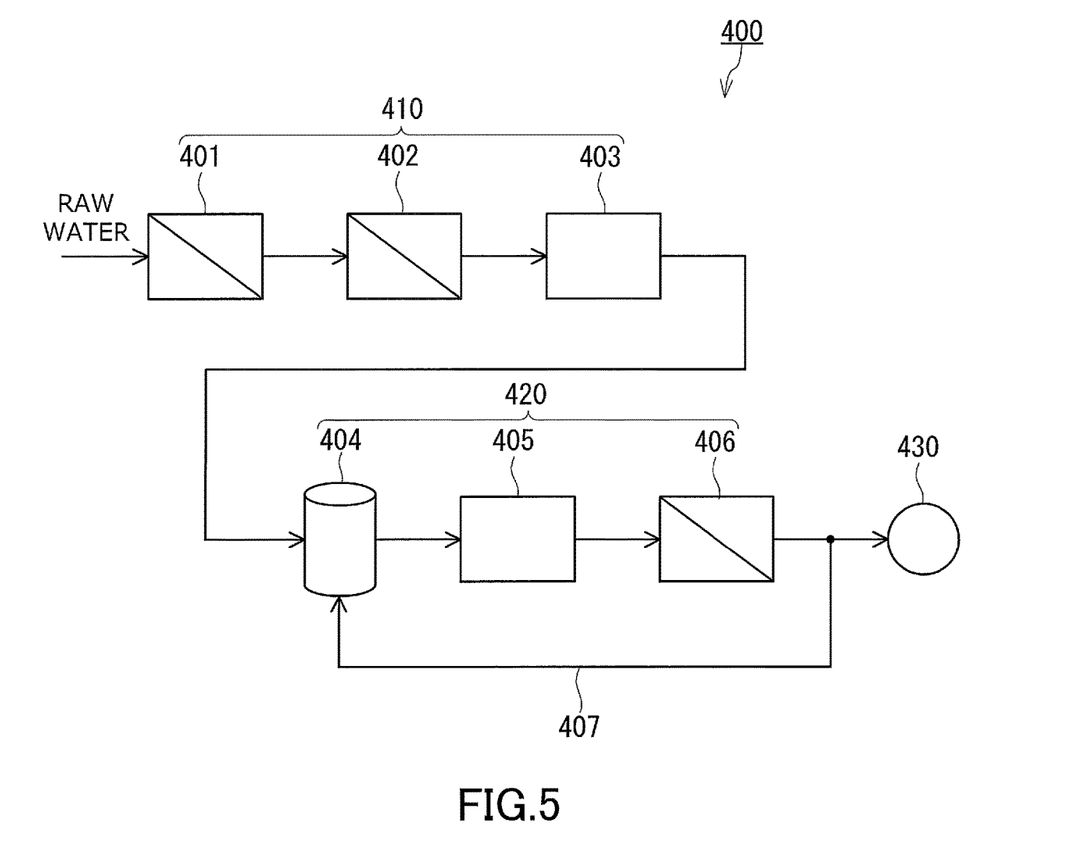
FIG. 5 is a configuration diagram of an example of a water treatment system in which the hollow fiber membrane module is used.

FIG. 5 illustrates an example of a configuration of a water treatment system 400 in which the hollow fiber membrane module 100 is used. The water treatment system 400 includes a primary treatment system 410 and a secondary treatment system 420. Water having been treated by the primary treatment system 410 is further treated by the secondary treatment system 420. The water treatment system 400 produces, for example, ultrapure water. The produced ultrapure water is fed to a predetermined use point 430.

The primary treatment system 410 includes an UF (ultra filtration) membrane module 401, a RO (reverse osmosis) membrane module 402, and various treatment devices 403 in order, respectively, from the upstream side in the water flowing direction. The various treatment devices 403 include, for example, at least one selected from a degassing device, an organic substance decomposing device (for example, decomposing device using ultraviolet rays), an EDI (electro-deionization) device, and an ion exchange resin cartridge. Permeate water in the UF membrane module 401 is fed to and treated in the RO membrane module 402. Permeate water in the RO membrane module 402 is fed to and treated in the various treatment devices 403.

The secondary treatment system 420 includes a tank 404, various treatment devices 405, and an UF membrane module 406 in order, respectively, from the upstream side in the water flowing direction. The various treatment devices 405 include, for example, at least one selected from a degassing device, an organic substance decomposing device (for example, decomposing device using ultraviolet rays), an EDI (electro-deionization) device, and an ion exchange resin cartridge. Water that is temporarily stored in the tank 404 is treated by the various treatment devices 405 and the UF membrane module 406. A part of permeate water in the UF membrane module 406 is returned to the tank 404 through a circulating circuit 407 such that water constantly circulates in the UF membrane module 406. Thus, purification is immediately performed by the UF membrane module 406 even if dust is generated and a component is eluted from a portion in contact with water in piping or the like. Therefore, high-quality ultrapure water can be continuously fed.

At least one selected from the UF membrane module 401 and the UF membrane module 406 is the hollow fiber membrane module 100 of the present embodiment. The UF membrane module 406 is a final filtering device disposed immediately before the use point 430. The UF membrane module 406 is required to exhibit a high purifying performance. Therefore, the hollow fiber membrane module 100 of the present embodiment is suitable for the UF membrane module 406. Needless to say, the hollow fiber membrane module 100 can be preferably used also for the UF membrane module 401.

EXAMPLES

The following experiments were conducted in order to confirm the effect of the present invention.

(Method for Measuring Permeation Flux of Hollow Fiber Membrane)

The permeation flux of the hollow fiber membrane was measured by the following method. One end portion of the hollow fiber membrane was potted in a polyethylene tube having an outer diameter of 10 mm and an inner diameter of 8 mm. The potting portion that was potted in the polyethylene tube was cut, to form the end face communicating with the inside of the hollow fiber membrane. The other end portion of the hollow fiber membrane was sealed with resin to form a resin sealing portion. Thus, a module including a single hollow fiber membrane was produced. The length of the hollow fiber membrane excluding the potting portion and the resin sealing portion was 1.0 m. A load (transmembrane pressure difference) was applied to the module at an external pressure of 0.1 MPa, and an amount of permeate water was divided by a membrane area calculated from the outer diameter and the length of the hollow fiber membrane, to calculate the permeation flux of the hollow fiber membrane.

A flow path for concentrated water was not provided in the module having the single hollow fiber membrane. The flow path on the permeation side was fully opened (=0 Pa). Therefore, the pressure of the feed water was regarded as the transmembrane pressure difference.

Production Example 1

Polysulfone (manufactured by Solvay, UDEL (registered trademark) P-1700) as a polymer, N-methylpyrrolidone as a solvent, and diethylene glycol were kneaded by a kneader, to obtain a polymer solution. The concentration of the polysulfone in the polymer solution was 15.8% by weight. The concentration of the diethylene glycol in the polymer solution was 25% by weight. The solution was discharged from a hollow nozzle and was continuously put into a tank, to produce a hollow fiber membrane. The properties of the obtained hollow fiber membrane are indicated in Table 1.

Production Example 2

A hollow fiber membrane was produced in the same manner as in production example 1 except that the concentration of polysulfone was 15.5% by weight. The properties of the obtained hollow fiber membrane are indicated in Table 1.

TABLE 1

| | Permeation flux (L/m$^2$/h)@0.1 MPa | Tensile strength (kgf) |
|---|---|---|
| Production example 1 | 897 | 0.29 |
| Production example 2 | 1254 | 0.24 |

(Sample 1)
A hollow fiber membrane module having the structure described with reference to FIG. 1 was produced by using the hollow fiber membranes obtained in production example 1. The total membrane area was 36.8 m$^2$.
(Sample 2)
A hollow fiber membrane module having the structure described with reference to FIG. 1 was produced by using the hollow fiber membranes obtained in production example 2. The total membrane area was 36.8 m$^2$.

Experiment 1

The following experiment was conducted for the hollow fiber membrane module of sample 1. The permeate water outlet was closed, and ultrapure water was caused to flow from the feed water inlet toward the concentrated water outlet at a flow rate of 2 m$^3$/h for one hour. Thereafter, an air leak test was performed, and the hollow fiber membranes were checked for presence or absence of breakage. Furthermore, ultrapure water was caused to flow from the feed water inlet toward the concentrated water outlet for one hour at each of the flow rates of 4 m$^3$/h, 6 m$^3$/h, 8 m$^3$/h, 10 m$^3$/h, 12 m$^3$/h, and 14 m$^3$/h. Each time passing of water for one hour ended, an air leak test was performed. In a case where the permeate water outlet is closed, the hollow fiber is likely to be damaged by a hollow fiber being strongly drawn, by water flow toward the concentrated water outlet, near the binding portion.

Air leak was not detected at the flow rate of 2 to 10 m$^3$/h. In a case where ultrapure water was caused to flow at the flow rate of 12 m$^3$/h for one hour, air leak was detected in one hollow fiber membrane. In a case where ultrapure water was caused to flow at the flow rate of 14 m$^3$/h for one hour, air leak was detected in another hollow fiber membrane. This result indicates that, if a high load is continuously applied, to a hollow fiber membrane module including a high-strength hollow fiber membrane, in the direction perpendicular to the longitudinal direction of the hollow fiber membrane, even the hollow fiber membrane may be broken at a flow rate lower than 25 m$^3$/h. As described with reference to FIG. 4, it is difficult to achieve a flow rate of 25 m$^3$/h in the hollow fiber membrane module having a structure in which load is applied in the perpendicular direction.

Air leak occurred even in the hollow fiber membrane module of sample 1 in which the high-strength hollow fiber membrane was used. Therefore, air leak was assumed to more significantly occur in the hollow fiber membrane module of sample 2 in which a low-strength hollow fiber membrane was used.

Experiment 2

The following experiment was conducted for the hollow fiber membrane module of sample 1. The concentrated water outlet was closed, and ultrapure water was caused to flow from the feed water inlet toward the permeate water outlet at a flow rate of 5 m$^3$/h for one hour. That is, the total amount of the ultrapure water was caused to permeate. Thereafter, an air leak test was performed, and the hollow fiber membranes were checked for presence or absence of breakage. Furthermore, ultrapure water was caused to flow from the feed water inlet toward the permeate water outlet for one hour at each of flow rates of 10 m$^3$/h, 15 m$^3$/h, 20 m$^3$/h, 25 m$^3$/h, and 30 m$^3$/h. Each time passing of water for one hour ended, an air leak test was performed.

Air leak was not detected at each of the flow rates of 5 to 30 m$^3$/h. This indicates that the hollow fiber membrane module of the present embodiment has a structure suitable for producing ultrapure water at a high flow rate and cleaning at a high flow rate. The feed water flows in the direction parallel to the longitudinal direction of the hollow fiber membrane. Therefore, the hollow fiber membrane is unlikely to be broken. Therefore, the hollow fiber membrane module of the present embodiment has a structure that can achieve a flow rate of 25 m$^3$/h or higher and a permeation flux corresponding to the flow rate.

Experiment 3

The following experiment was conducted for the hollow fiber membrane module of each of sample 1 and sample 2.

The concentrated water outlet was closed, and ultrapure water was caused to flow from the feed water inlet toward the permeate water outlet at a flow rate of 15 m$^3$/h (408 liter/m$^2$/h). After the flow rate of the feed water was 0 m$^3$/h, the flow rate was restored to 15 m$^3$/h within two seconds. This process was repeated to perform a load resistance test. One cycle was performed in seven seconds, and the load resistance test was performed 10000 or more times. Thereafter, an air leak test was performed, and the hollow fiber membranes were checked for presence or absence of breakage. Furthermore, the load resistance test was performed 10000 times similarly at a flow rate of 25 m$^3$/h (679 liter/m$^2$/h). Thereafter, an air leak test was performed again, and the hollow fiber membranes were checked for presence or absence of breakage. The result is indicated in Table 2.

TABLE 2

|  | Low flow rate (15 m$^3$/h) times | High flow rate (25 m$^3$/h) (times) |
|---|---|---|
| Sample 1 | 10164 | 10658 |
| Sample 2 | 10291 | Leak occurred |

In the hollow fiber membrane module of sample 1, both after the load resistance test was performed at a low flow rate 10164 times, and after the load resistance test was performed at a high flow rate 10658 times, air leak was not detected.

In the hollow fiber membrane module of sample 2, after the load resistance test was performed at a low flow rate 10291 times, air leak was not detected. However, in a case where the load resistance test was performed for the hollow fiber membrane module of sample 2 at a high flow rate 10000 times, air leak was detected. This may have been caused due to the strength of the hollow fiber used for the hollow fiber membrane module of sample 2 being slightly low.

Experiment 4-1

(Cleaning Test)

Figure 6:
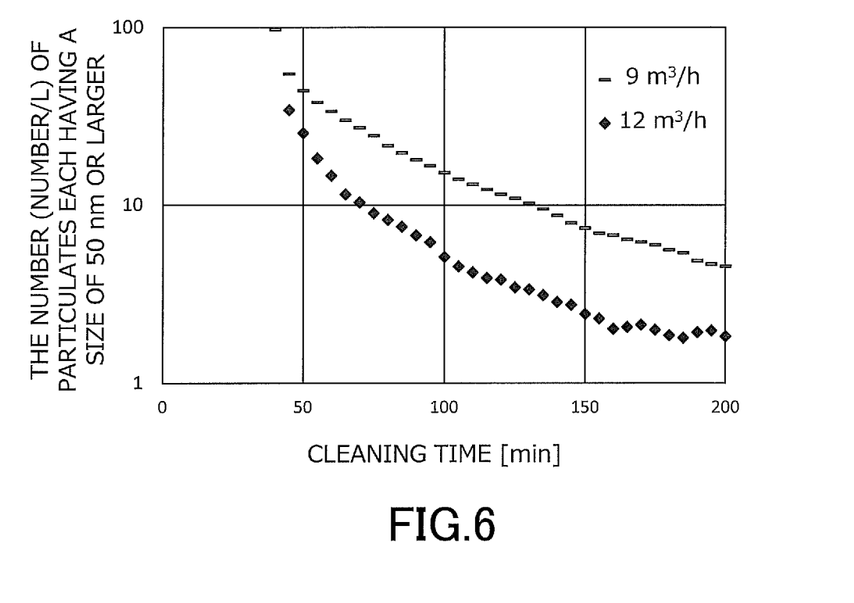
FIG. 6 shows a graph representing a result of a cleaning test.

In the hollow fiber membrane module of sample 1, the concentrated water outlet was closed, and ultrapure water was caused to flow from the feed water inlet toward the permeate water outlet at a feed water flow rate of 12 m$^3$/h. The number of particulates, in permeate water, each of which had a size of 50 nm or larger was obtained in real time. The number of particulates was obtained by a particle counter Ultra DI (registered trademark) 50 (available from Particle Measuring Systems Inc.). Sampling for the number of particulates was performed at five minute intervals in a case where a cleaning start time was 0 minutes. The number (number/L) of particulates at a certain cleaning time (min) was calculated in the following manner. Measured values at time points earlier than the certain cleaning time by 25 minutes, 20 minutes, 15 minutes, 10 minutes, 5 minutes, and 0 minutes were prepared, and an arithmetic average value of these six pieces of data was set as a measured value at the certain cleaning time. FIG. 6 shows the results.

Experiment 4-2

The same experiment as in experiment 4-1 was conducted except that ultrapure water was caused to flow at a feed water flow rate of 9 m$^3$/h in the hollow fiber membrane module of sample 1. FIG. 6 shows the results.

In FIG. 6, the vertical axis represents the number (number/L) of the detected particulates each having a size of 50 nm or larger. The horizontal axis represents an operation time (water passing time). The number of particulates detected in permeate water in the hollow fiber membrane module was reduced in experiment 4-1 earlier than in experiment 4-2. The number of particulates became less than 10 particles/L at a flow rate of 12 m$^3$/h (experiment 4-1) at an operation time of 75 minutes. The number of particulates became less than 10 particles/L at a flow rate of 9 m$^3$/h when the operation time of 135 minutes elapsed. This indicates that the hollow fiber membrane module can be cleaned in a short time period in the operation at a high flow rate, that is, that the module rises quickly.

The results in FIG. 6 represent the results of cleaning of the hollow fiber membrane module of sample 1 at a flow rate of 12 m$^3$/h. However, as is apparent from experiment 2, the hollow fiber membrane module of sample 1 can be cleaned at a flow rate of each of 25 m$^3$/h and 30 m$^3$/h. It is assumed that a time (cleaning time) until the number of particulates each having a size of 50 nm or larger becomes less than 10 particles/L can be further shortened by increasing the flow rate.

The hollow fiber membrane module of the present invention is useful for a water treatment system for producing ultrapure water.

What is claimed is:

1. A hollow fiber membrane module comprising:
   a plurality of hollow fiber membranes;
   a container storing the plurality of hollow fiber membranes;
   a feed water inlet provided at one end portion of the container such that a direction in which feed water flows into the container is parallel to a longitudinal direction of the plurality of hollow fiber membranes;
   a first binding portion provided at one end portion of the plurality of hollow fiber membranes;
   a second binding portion provided at the other end portion of the plurality of hollow fiber membranes, and
   a baffle disposed between the feed water inlet and one end portion of the plurality of hollow fiber membranes, wherein
   the hollow fiber membrane module is configured as an external-pressure type in which the feed water flows outside the plurality of hollow fiber membranes and permeate water flows inside the plurality of hollow fiber membranes,
   the feed water inlet is provided such that the feed water does not directly collide with the plurality of hollow fiber membranes in the direction perpendicular to the longitudinal direction of the plurality of hollow fiber membranes,
   a gap is present between the baffle and the first binding portion,
   a plurality of through holes are provided in an outer circumferential portion of the baffle along the circumferential direction,
   the baffle prevents flow of the feed water from directly colliding with the hollow fiber membranes and the first binding portion when the feed water is introduced through the feed water inlet into the container,
   a permeation flux of the hollow fiber membranes at a transmembrane pressure difference of 0.1 MPa is higher than or equal to 850 liter/m$^2$/h, the container comprises a container body, a first cap attached to one end portion of the container body, and a second cap attached to the other end portion of the container body, the second binding portion is fixed to the second cap by using an adhesive, the plurality of hollow fiber membranes, the second binding portion, and the second cap form a unit that is separable from each other only in a destructive manner, and the unit is detachable from the container body in a non-destructive manner, the plurality of hollow fiber membranes are sealed at the one end portion by the first binding portion, the other end portion of the plurality of hollow fiber membranes are opened at an end face of the second binding portion, the second binding portion separates a feed water flow path and a permeate water flow path from each other in the container, the first binding portion has no through hole that penetrates the first binding portion in the direction parallel to the longitudinal direction of the plurality of hollow fiber membranes, in the container, internal spaces SP1, SP2, and SP3 that act as flow paths are present, the internal space SP1 is an internal space of the container body and acts as the feed water flow path, the internal space SP2 is an internal space of the first cap and acts as the feed water flow path, the internal space SP3 is an internal space of the second cap and acts as the permeate water flow path, the feed water flows from the internal space SP2 through the plurality of through holes of the baffle toward the internal space SP1, and the permeate water is sent through the internal space SP3 from the plurality of hollow fiber membranes to the outside of the hollow fiber membrane module.

2. The hollow fiber membrane module according to claim 1, wherein a tensile strength of each hollow fiber membrane is higher than or equal to 0.20 kgf.

3. The hollow fiber membrane module according to claim 1, further comprising:
a plurality of inner nets binding the plurality of hollow fiber membranes such that the plurality of hollow fiber membranes are separated into a plurality of bundles; and
an outer net binding the plurality of inner nets.

4. The hollow fiber membrane module according to claim 1, further comprising a concentrated water outlet provided at the other end portion of the container such that a direction in which the feed water flows from the container to outside of the container is perpendicular to the longitudinal direction.

5. The hollow fiber membrane module according to claim 1, wherein the hollow fiber membrane module is used for producing ultrapure water.

6. The hollow fiber membrane module according to claim 1, wherein
the baffle is plate-like,
the plurality of the through holes are provided only in the outer circumferential portion of the baffle along the circumferential direction, and
the first binding portion is located inside an outer edge of the baffle in a radial direction of the baffle.

7. The hollow fiber membrane module according to claim 1, wherein an outer edge of a projected view obtained by projecting the first binding portion onto the second binding portion in the direction parallel to the longitudinal direction of the plurality of hollow fiber membranes is located inside an outer edge of the second binding portion.

* * * * *